(12) United States Patent
Markovic

(10) Patent No.: US 6,416,085 B1
(45) Date of Patent: Jul. 9, 2002

(54) PRESSURIZED HOSE COUPLING

(76) Inventor: Branimir Markovic, 30 Stanton, Apt. 606, Montreal (CA), H3Y 3B2

(*) Notice: Subject to any disclaimer, the term of this patent is extended or adjusted under 35 U.S.C. 154(b) by 0 days.

(21) Appl. No.: 09/687,075

(22) Filed: Oct. 16, 2000

(51) Int. Cl.[7] ............................................... F16L 17/00
(52) U.S. Cl. ..................... 285/102; 285/103; 285/104; 285/105; 285/242
(58) Field of Search ..................... 285/93, 95, 100–105, 285/83, 86, 242, 255, 306, 921

(56) References Cited

U.S. PATENT DOCUMENTS

| | | | | |
|---|---|---|---|---|
| 3,885,819 A | * | 5/1975 | Egerer et al. | 285/93 |
| 4,548,427 A | * | 10/1985 | Press et al. | 285/55 |
| 4,946,200 A | * | 8/1990 | Blenkush et al. | 285/38 |
| 5,172,943 A | * | 12/1992 | Shimada | 285/323 |
| 5,582,436 A | * | 12/1996 | Bartholomew | 285/242 |

FOREIGN PATENT DOCUMENTS

| | | | | |
|---|---|---|---|---|
| DE | 2635871 | * | 2/1978 | 285/242 |
| DE | 163992 | * | 12/1985 | 285/95 |
| FR | 1065111 | * | 5/1954 | 285/95 |
| JP | 3282086 | * | 9/1991 | 285/101 |

* cited by examiner

*Primary Examiner*—Lynne H. Browne
*Assistant Examiner*—Michael P Ferguson
(74) *Attorney, Agent, or Firm*—Ogilvy Renault; Guy J. Houle

(57) ABSTRACT

A fluid pressure hose coupling for connecting a flexible hose to a pressurized fluid line. The coupling has a connecting end section for securement to a pressurizable line and a cylindrical nipple end section for securing an end section of a flexible hose thereto. The nipple end section has a tapered cone-like outer surface having a larger outer diameter section at a free end thereof. A cylindrical hose clamping sleeve is positionable about the nipple end section and also has an inwardly tapered inner surface whose diameter is larger at the front end thereof and wherein the inner surface of the clamping sleeve and the outer surface of the cylindrical nipple end section extend parallel to one another. By positioning a flexible hose end section over the nipple and placing the hose clamping sleeve over the hose end section and by applying pressure in the line and pulling the sleeve and hose sections together, in an outward direction, the hose end section becomes clampingly secured between the clamping sleeve and the tapered outer surface of the nipple end section. To disconnect the hose pressure is removed and the hose clamping sleeve is pushed rearwardly to clear the hose end section which may then be pulled off the nipple end. The clamping sleeve may also have a piston end located in a channel which is in communication with the pressurized fluid whereby the pressurized fluid displaces the sleeve in clamping engagement with the end section of the hose.

8 Claims, 6 Drawing Sheets

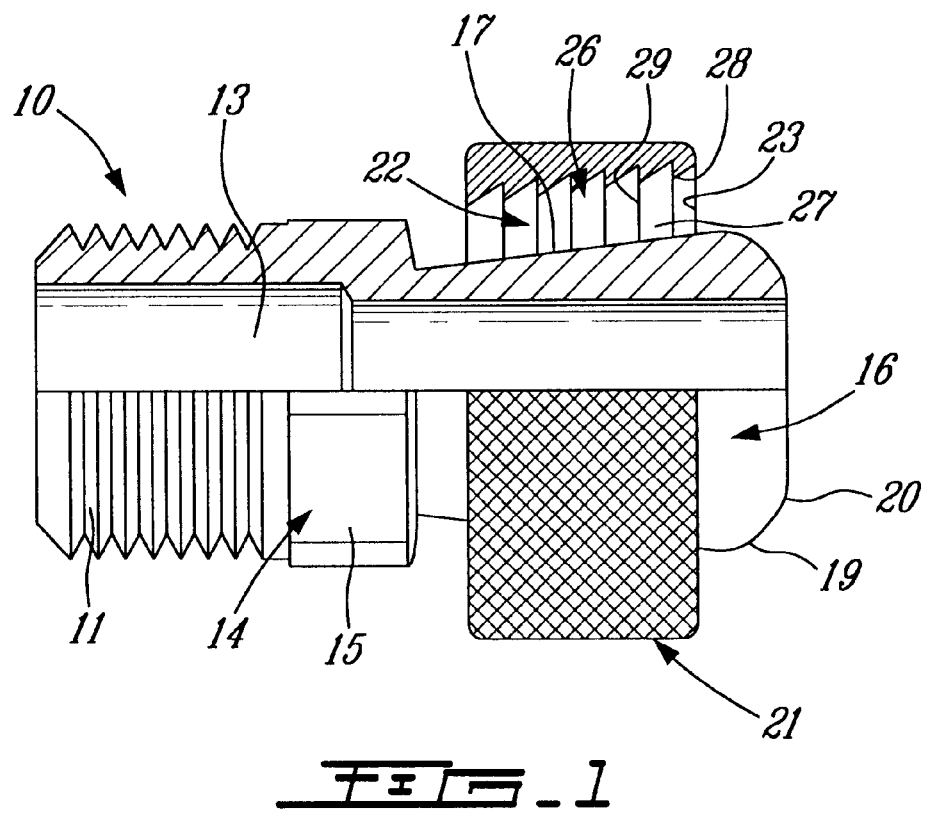
FIG_1
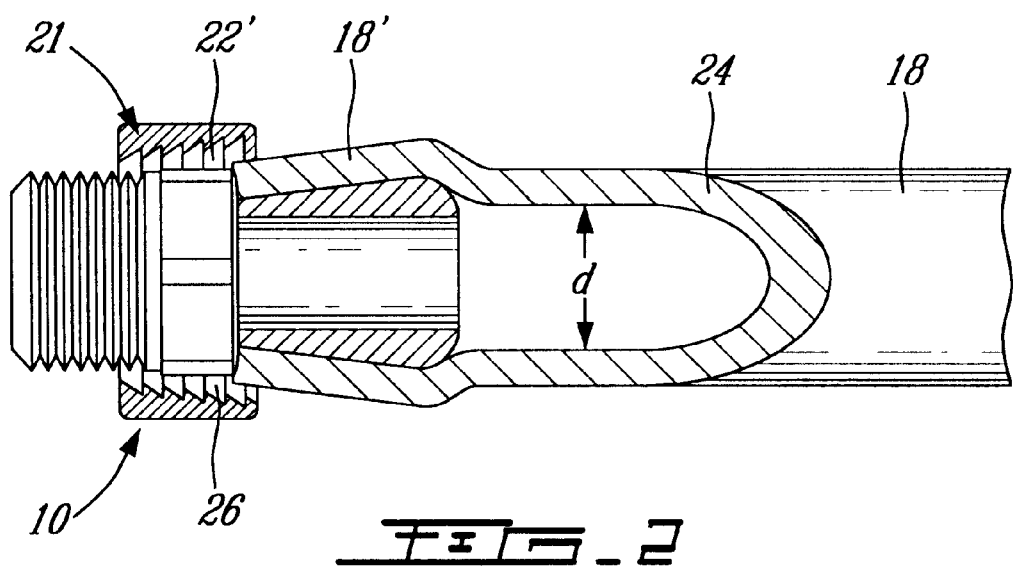
FIG_2

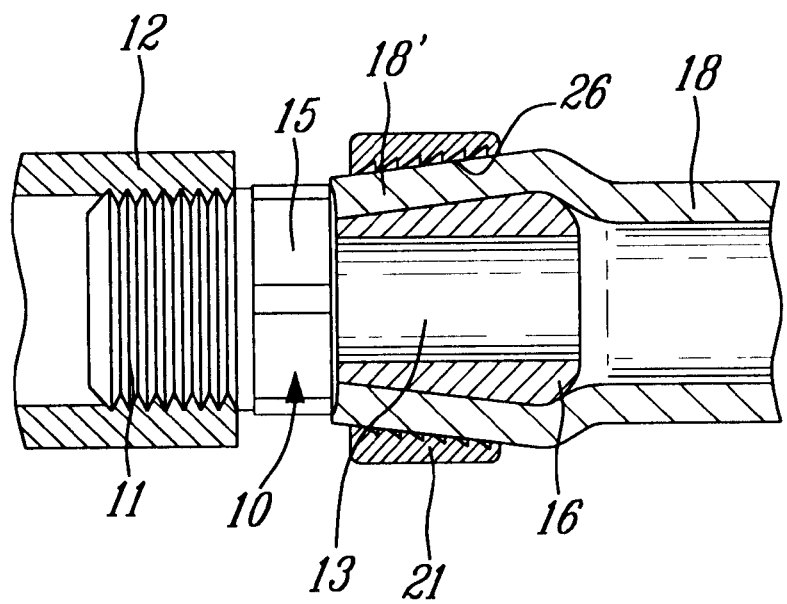
FIG_3
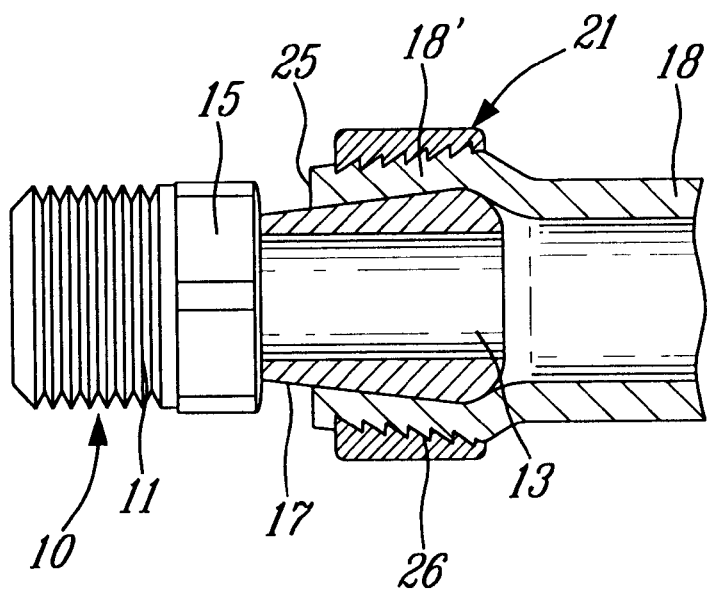
FIG_4

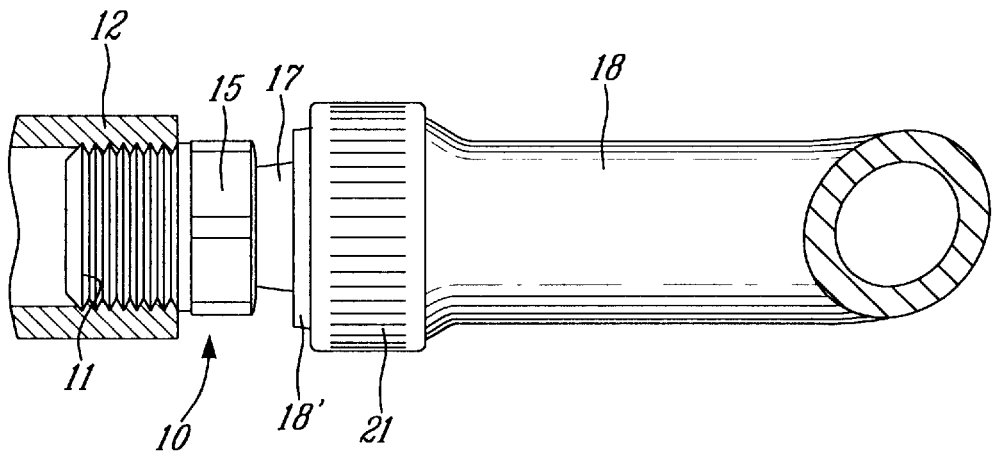
FIG_5
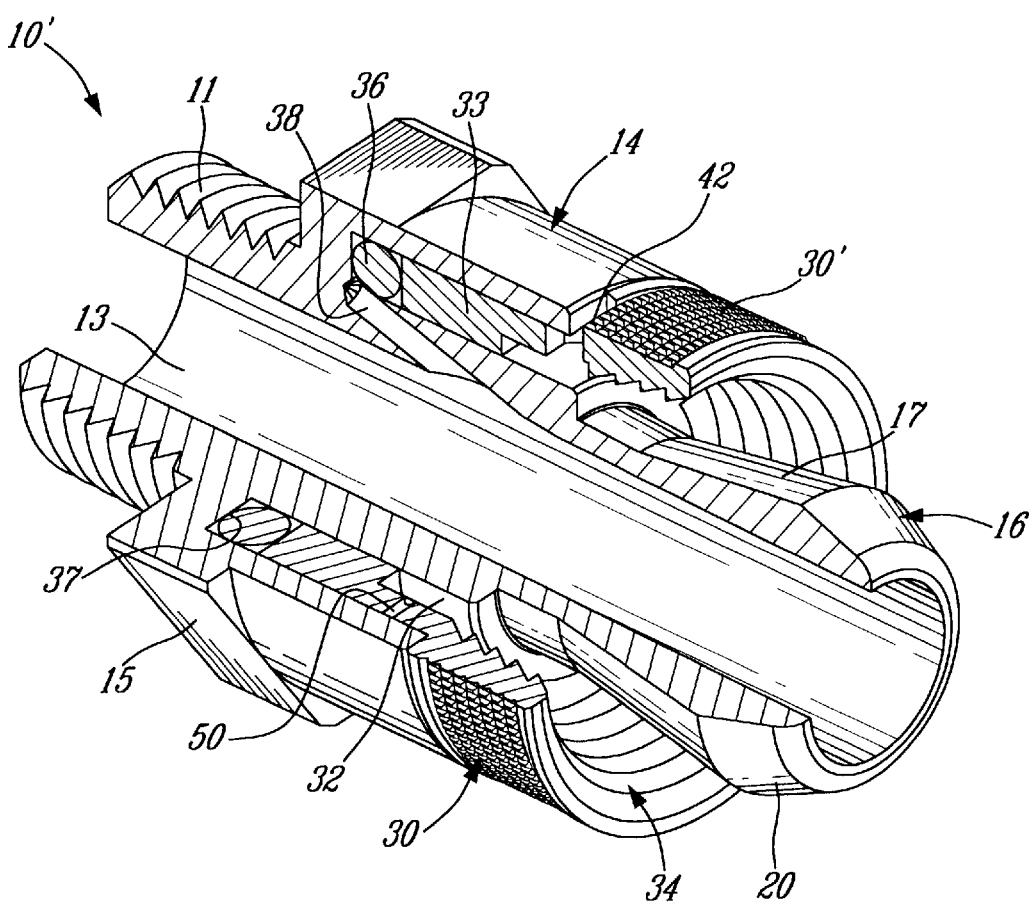
FIG_6

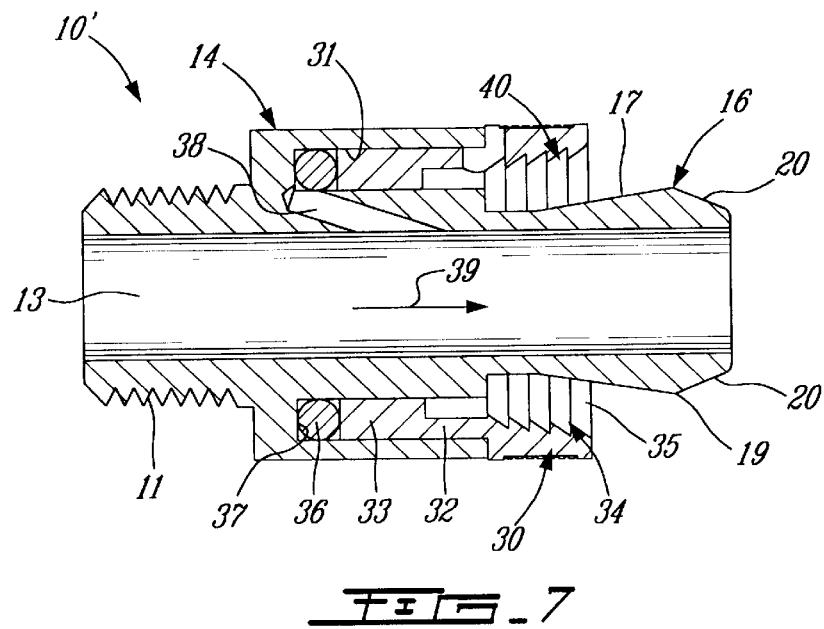
FIG_7
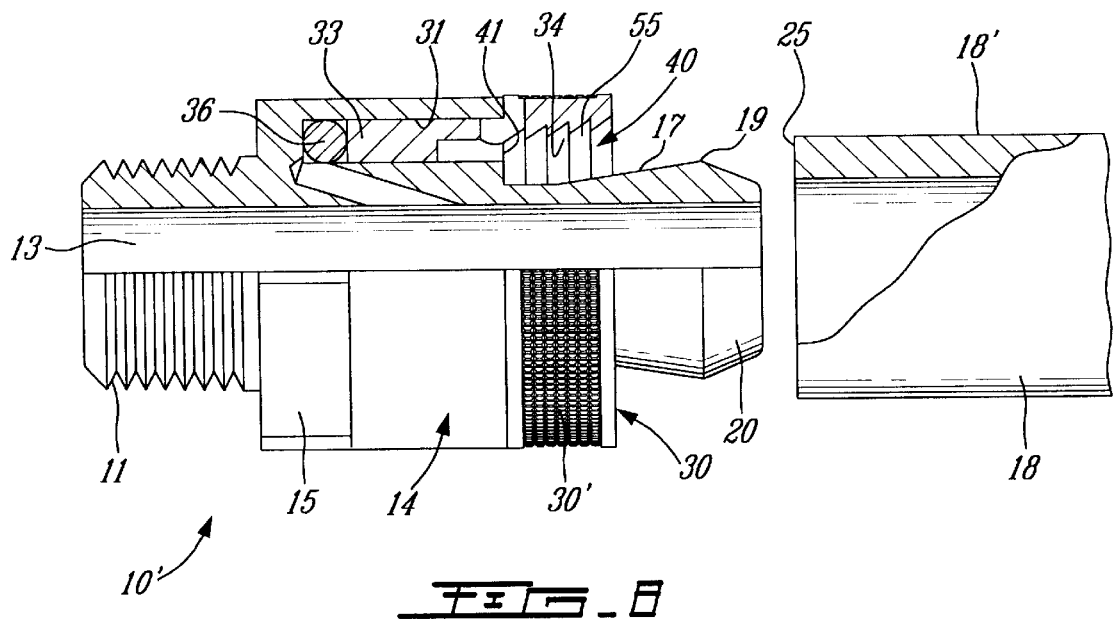
FIG_8

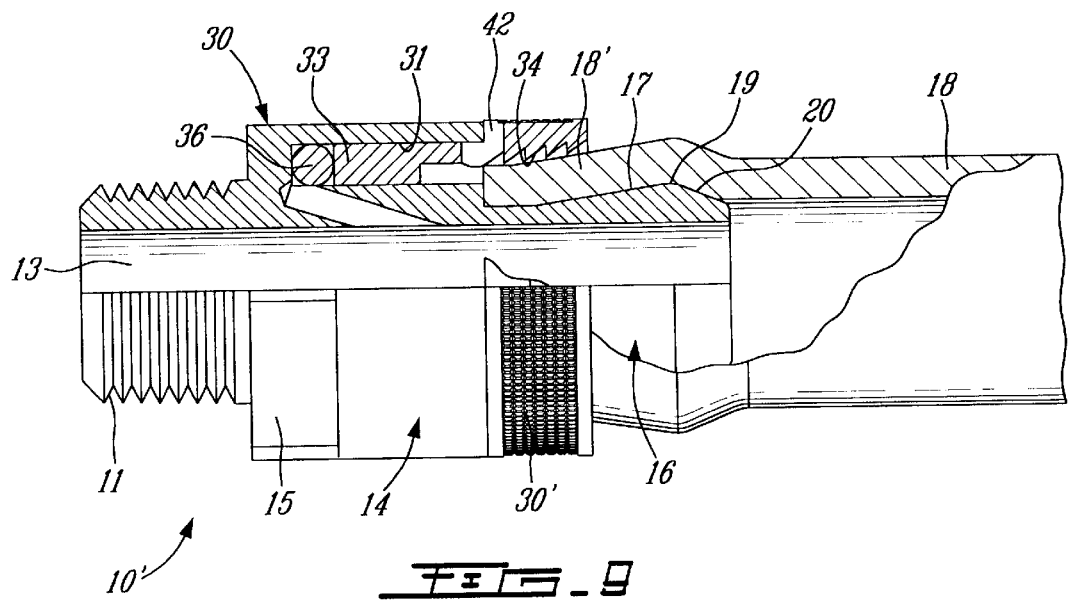
FIG_9
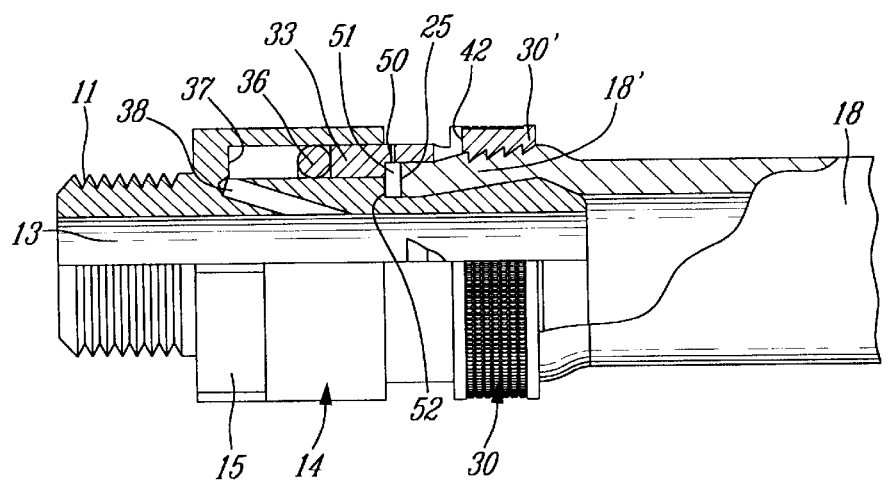
FIG_10

PRESSURIZED HOSE COUPLING

TECHNICAL FIELD

The present invention relates to a pressurized hose coupling which is simple in construction and which uses line pressure to positively engage a flexible hose with the coupling.

BACKGROUND ART

Various pressurized air hose couplings are known to couple a pressurized line to a flexible hose. Couplings using nipple ends and lock collars are also known and reference is made to U.S. Pat. No. 3,885,819 as a typical example of prior art couplings that resemble the type of connector to which the present invention relates. However, in that patent, the connector utilizes an end cap to receive the end of the hose fitted over the nipple. The sleeve is also dimensioned to be supported on the end cap. The nipple is provided with ridges as well as the inner surface of the ring. The end cap is also transparent to locate the end of the hose to make sure it remains immovable on the nipple.

In the patent, the sleeve is hand-squeezed forwardly on the hose to connect the hose between its ridges and the ridges of the nipple. The cap is also preferably formed of a thermoplastic material to retain the steel ring thereon by friction fit. Alternatively, the ring could be formed of plastic and the abutment cap formed of steel to obtain the same friction-fit retention. A problem with such design is that because the nipple has ridges thereon, it is sometimes difficult to push the hose entirely over the elongated nipple and locate it into the cap cavity. Also, the ring must be drawn forward towards the enlarged portion of the nipple in order to squeeze the hose tightly thereover while at the same time maintaining the hose snuggly fitted in the end cap. This finger force securement of the ring does not always result in a solid attachment of the flexible hose end over the nipple and could cause the hose to loosen and disconnect during use or cause leakage. Furthermore, the inner surface of the sleeve is not parallel to the nipple outer surface and therefore only a portion of the sleeve is used to clamp the hose and making it more susceptible to leakage.

SUMMARY OF INVENTION

It is a feature of the present invention to provide a fluid pressure hose coupling which overcomes the above-mentioned disadvantage of the prior art and which is simple to construct and has fewer parts.

Another feature of the present invention is to provide a fluid pressure hose coupling which utilizes the pressure in the supply line to effect the attachment of the flexible hose on the nipple end of the coupling and wherein the hose as well as the hose clamping sleeve is displaced during connection of the hose to the coupling.

Another feature of the present invention is to provide a fluid pressure hose coupling wherein a flexible hose end can be easily slid over a nipple outer smooth surface, easily secured thereover and easily disconnectable from the coupling.

A still further feature of the present invention is to provide a fluid pressure hose coupling wherein the hose pressure in the line acts against the cylindrical hose clamping sleeve to assist in displacing the sleeve over the hose as the sleeve and the hose are pulled together over the nipple.

According to the above features, from a broad aspect, the present invention provides a fluid pressure hose coupling for connecting a flexible hose to a pressurized fluid line. The coupling has a through bore. Connecting means is provided for securing the body to a pressurizable line. The coupling has a cylindrical nipple end section having a circumferentially smooth tapered cone-like outer surface having a larger outer diameter section at a free end thereof. The larger outer diameter is greater than an inner diameter of a flexible hose to slide thereover. The free end has an inwardly tapered circumferential front end wall adapted to assist a hose end inner wall section to be slid over the smooth tapered cone-like outer surface of the nipple end section. A cylindrical hose clamping sleeve is positionable about the nipple end section and has an inwardly tapered inner surface whose diameter is larger at a front end thereof. The inner surface is parallel to the nipple end section outer surface. The cylindrical sleeve when disposed concentrically about the nipple end section with the larger inner diameter at the front end aligned with the larger outer diameter section of the nipple, forms a hose compression gap which is narrower than a wall thickness of an end section of a flexible hose to be slid over the nipple end section whereby positioning the sleeve over the hose end section, when disposed over the nipple end section, and drawing the hose and sleeve towards the free end of the coupling when fluid pressure is applied, causes the sleeve to compress the inner hose section over at least the larger outer diameter section of the tapered outer surface of the nipple end section. The hose end section is disconnected from the nipple end section by removing pressure from the hose and pushing the sleeve rearwardly away from the nipple end section free end out of contact with the hose and pulling the hose out of frictional engagement with the nipple end section.

According to another broad aspect of the present invention there is provided a fluid pressure hose coupling having a cylindrical nipple end section as above-described but wherein a circumferential channel is provided in the body and disposed concentrically about the nipple rearwardly thereof. The channel has an open end facing the free end of the nipple end section and disposed above the larger outer diameter section. A cylindrical hose clamping sleeve having a cylindrical piston end and an opposed inwardly tapered inner clamping surface whose diameter is larger at a front end thereof is also provided. The inner surface is parallel to the nipple end section outer surface. A flexible O-ring is disposed in the channel adjacent an end wall of the channel. Conduit means interconnects the end wall to the through bore. The cylindrical piston end when disposed in the channel against the O-ring forms a hose end receiving gap between the tapered inner surface of the clamping sleeve and the tapered outer surface of the nipple end section to receive an end section of a flexible hose slid over the nipple end section and into the compression gap whereupon, when fluid pressure is applied to the line, pressure will act upon the O-ring through the conduit means and against the cylindrical piston end urging the clamping sleeve together with the hose end section outwardly and causing the hose end section to be compressed between the tapered inner surface of the clamping sleeve and the larger outer diameter section at a free end of the tapered outer surface of the nipple end section which move closer together to diminish the gap a distance less than the thickness of the hose.

BRIEF DESCRIPTION OF DRAWINGS

A preferred embodiment of the present invention will now be described with reference to the accompanying drawings in which:

FIG. 1 is an exploded partly sectioned view of a first embodiment of a fluid pressure hose coupling of the present invention;

FIG. 2 is a view similar to FIG. 1 but showing a hose positioned over the smooth tapered cone-like outer surface of the cylindrical nipple end section of the coupling;

FIG. 3 is a still further view similar to FIG. 2 but showing the cylindrical hose clamping sleeve positioned over the hose;

FIG. 4 is a view similar to FIG. 3 but showing the position of the hose and cylindrical hose clamping sleeve in a secured position about the nipple end section of the coupling;

FIG. 5 is a side view of a hose coupled to the coupling and a partly section view of the threaded connector secured to a pressurized line;

FIG. 6 is a fragmented perspective view of a further embodiment of a fluid pressure hose coupling constructed in accordance with the present invention;

FIG. 7 is a section view of the hose-coupling of FIG. 6;

FIG. 8 is a partly sectioned side view of the fluid pressure hose coupling of FIG. 6 and showing an end section of a flexible hose to be secured thereto;

FIG. 9 is a view similar to FIG. 8 but showing the end section of the flexible hose disposed over the nipple end section of the coupling;

FIG. 10 is a view similar to FIG. 9 but showing the hose in its secured position over the nipple end section and the hose clamping sleeve in engagement therewith.

DESCRIPTION OF PREFERRED EMBODIMENTS

Figure 11:
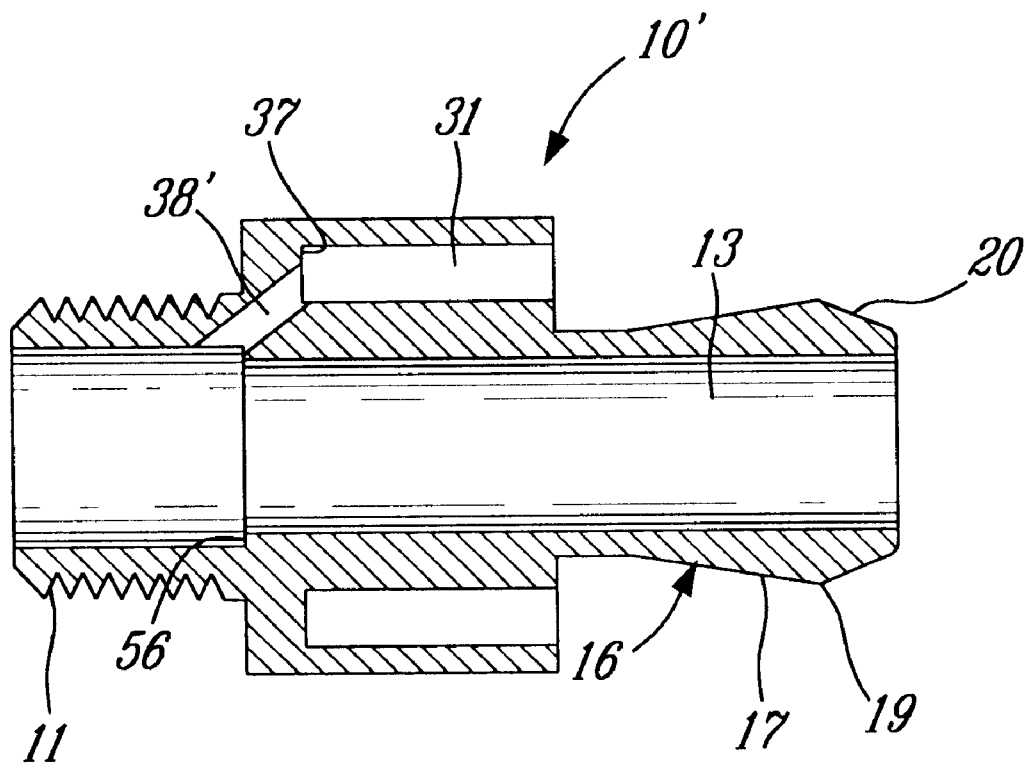
FIG. 11 is a section view of the coupling showing a modification of the conduit leading to the circumferential channel formed in the body.

Referring now to the drawings, and more particularly to FIGS. 1 to 5, there will be described the construction and operation of the fluid pressure hose coupling 10 of a first embodiment of the present invention. As hereinshown, the coupling 10 has a threaded connecting pipe section 11 for threaded engagement with a pressure line 12, as shown in FIG. 5. A through bore 13 extends through the body 14 of the coupling. The body 14 also has a hexagon cylindrical section 15 whereby to be engaged by a tool to thread the connecting pipe section 11 in the pressure line 12.

The coupling 10 is also provided at the opposed end to the threaded pipe section 11 with a cylindrical nipple end section 16 provided with a circumferentially smooth tapered cone-line outer surface 17. This smooth surface facilitates the sliding of the end section 18' of a flexible pipe 18 thereover. As also hereinshown, the nipple end section 16 has a larger outer diameter section 19 at a free end thereof. The larger diameter is greater than the inner diameter "d" of the flexible hose 18 to be slid thereover. The free end of the nipple end section also has an inwardly tapered circumferential front end wall 20 which assists the hose end inner wall section to be slid over the smooth tapered cone-like outer surface 17.

A cylindrical hose clamping sleeve 21 is positioned about the nipple end section 16 and has an inwardly tapered inner surface 22 whose diameter is larger at a front end 22' thereof and tapers inwardly towards the rear end. The inner surface 22 extends substantially parallel to the nipple end section outer surface 17.

As can be seen from FIGS. 1 to 4, when the cylindrical sleeve is disposed concentrically about the nipple end section with the larger inner diameter at the front end aligned with the larger outer diameter section 19 of the nipple end section it forms a hose compression gap 23 which is narrower than the thickness of the wall 24 of the flexible hose 18 to be slid over the nipple end section whereby positioning the sleeve over the hose end section and drawing the hose and the sleeve together towards the free end of the coupling when fluid pressure is applied to the line 12, causes the sleeve to compress the hose section over at least the larger outer diameter section 19 of the tapered outer surface of the nipple end section, as clearly shown in FIG. 4. As hereinshown, the end wall 25 of the flexible hose 18 also displaces itself away from the tool engaging portion 15 of the connector and as it slides up the nipple smooth outer surface 17, it becomes positively engaged by the gripping means herein constituted by a plurality of circumferential ridges 26 provided on the inner surface of the sleeve 21.

The gripping means may also be constituted by different types of projections extending inwardly from the inner surface 22 of the sleeve and hereinshown it is comprised of two or more circumferential ridges of sawtooth cross-section, each defining a rearwardly sloping front wall 27 leading to a sharp ridge 28 and an abrupt transverse rear wall 29. The inner surface 22 of the sleeve may also be casted or machined to be a rough surface to provide frictional retention with the outer surface of the flexible piping and thus providing some gripping thereof as the force acting on the sleeve is that of the pulling finger force provided by the user person as well as the pushing force exerted in the hose by the pressure which can be in the order of 100 psi. Both these forces provide for a solid compression attachment of the hose clamping sleeve about the flexible hose.

In order to disconnect the hose end section from the nipple end section of the coupling, it is necessary to remove pressure from the hose section or the pressure line 12 and pushing the sleeve and hose end rearwardly on the smooth outer surface 17 away from the nipple end section until the sleeve is out of contact with the hose. Thereafter the hose is simply pulled out of its frictional engagement with the nipple end section.

Referring now to FIGS. 6 to 10, there is shown a further embodiment of the pressure hose coupling, herein generally designated by reference numeral 10'. This coupling 101 is also provided with a cylindrical nipple end section 16 having the smooth outer surface 17 and the inwardly tapered circumferential front end wall 20 to facilitate slipping the end section of the flexible hose 18 thereover. The coupling also has the threaded connecting pipe section 11 and the tool engaging section 15. However, in this embodiment, the body 14 of the coupling and its sleeve 30 are differently constructed as will be described hereinbelow.

As more clearly illustrated in FIG. 7, the coupling body 14 is provided with a circumferential channel 31 which is disposed concentrically about the nipple end section 16 and disposed rearwardly thereof. The circumferential channel has an open end 32 facing the free end section of the nipple and is disposed above the larger outer diameter section 19. The cylindrical hose clamping sleeve 30 is provided with a cylindrical piston end 33 and an opposed inwardly tapered inner clamping surface 34 whose diameter is larger at a front end 35 thereof. The inner clamping surface 34 extends substantially parallel to the nipple end section outer surface 17, as is the case with the hose coupling of the first embodiment. A flexible O-ring 36 is disposed in the channel 31 adjacent an end wall 37 of the channel. Conduit means in the form of a rearwardly angulated conduit 38 interconnects the rear portion of the channel 31 to the through bore 13 of the coupling. The conduit 38 is inwardly sloped whereby not to obstruct the pressured air flow flowing through the coupling in the direction of arrow 39.

As hereinshown, when the cylindrical piston end 33 of the clamping sleeve 30 is disposed in the channel 31 against the O-ring 36, it forms a hose receiving gap between the tapered inner surface 34 of the clamping sleeve and the tapered outer smooth surface 17 of the nipple end section to receive the end section 18' of the flexible hose 18, as more clearly illustrated in FIG. 9. As previously described, the end section 18' of the flexible pipe is slid over the nipple end section and this is facilitated by the smoothness of the front end wall 20 and outer surface 17. The end wall 25 of the flexible pipe is slid over the nipple end section until it abuts the abutment wall 41 of the coupling body below the open end 32 of the channel 31. However, because the end section of the flexible pipe is disposed under the clamping sleeve 30 there is further provided a sighting hole 42 in the clamping sleeve and aligned with the abutment wall 41 whereby the hose end is visible under the sleeve 30 to make sure the hose is in proper position.

With the hose end section positioned over the nipple end section as shown in FIG. 9, the sleeve can then be placed in engagement with the hose section. To do this, fluid pressure is applied to the line and into the flexible hose 18 and the fluid pressure passes through the conduit 38 and pushes the O-ring 36 forwardly into the channel applying pressure against the piston end section 33 of the sleeve. The pushing force of the fluid pressure cause the sleeve and the end section of the flexible hose to move forwardly to an engaged position as illustrated in FIG. 10. The hose end section is then compressed between the tapered inner surface 34 of the clamping sleeve 30 and the larger outer diameter section 19 at the free end of the tapered outer smooth surface of the nipple end section 16 as these surfaces move closer together to diminish the gap opening to a distance which is less than the thickness of the hose. The O-ring is in constant pressure against the sleeve as long as there is pressure in the line, thus preventing accidental disconnection of the sleeve.

As shown in FIG. 10, the cylindrical piston end 33 is further provided with a fluid exhaust hole 50 in an intermediate area thereof whereby to exhaust any fluid that may accumulate in the space 51 formed between the rear circumferential wall 25 of the flexible hose 18 and an inner surface portion 52 as well as the rear abutment wall 41 behind the nipple end section which is formed as the hose is initially urged outwardly with the cylindrical piston.

Similar to the embodiment described in FIGS. 1 to 5, the inner clamping surface 34 is also provided with gripping means to engage in the outer surface of the flexible hose end section. Again this gripping means is hereinshown as constituted by gripping projections in the form of one or more circumferential ridges 55 of sawtooth cross-section.

It is also pointed out that the cylindrical-piston end 33 of the sleeve is dimensioned for close sliding fit in the circumferential channel. The flexible O-ring is formed of suitable material such as rubber and is displaced in close friction fit for fluid pressure sealing contact in the channel whereby to prevent any leakage. It is pointed out that the O-ring may have a different cross-sectional shape.

In order to disconnect the hose from the connector, it is first necessary to remove the fluid pressure within the line and to push back the clamping sleeve and hose end over the smooth outer surface 17. As the end section of the hose moves rearwardly, the gripping surface of the sleeve disengages with the outer surface of the hose. The connector assembly and the hose end section is thus in the position as shown in FIG. 9 and by holding firmly on the sleeve 30 about its knurled surface 30', the hose end section 18' can be pulled away from the smooth nipple end section 16.

FIG. 11 shows a further modification of the connector 10' and as hereinshown the conduit 38' is formed differently than that illustrated in FIG. 7. This conduit 38' extends into the end wall 37 of the circumferential channel 31 immediately behind the O-ring 36. The conduit extends in front of the step portion 56. Although not shown, one or more of these conduits could be formed in the coupling body but it has been found that a single one is sufficient to apply the pushing force against the piston end of the clamping sleeve.

It is within the ambit of the present invention to cover any obvious modifications of the preferred embodiments described herein, provided such modifications fall within the scope of the appended claims.

I claim:

1. A fluid pressure hose coupling for connecting a flexible hose to a pressurized fluid line, said coupling having a body with a through bore, connecting means for securing said body to a pressurized line, said coupling having a cylindrical nipple end section having a circumferentially smooth tapered outer surface having a larger outer diameter section at a free end thereof, said larger outer diameter being greater than an inner diameter of a flexible hose to be disposed thereover, said free end having an inwardly tapered circumferential front end wall adapted to assist a hose end inner wall section to be slid over said nipple end section, said coupling body having a circumferential channel in said body disposed concentrically about said nipple rearwardly thereof, said channel having an open end facing said nipple end section and disposed above said larger outer diameter section, a cylindrical hose clamping sleeve having a cylindrical piston end and an opposed inwardly tapered inner clamping surface whose diameter is larger at a front end thereof, said inner surface being parallel to said nipple end section outer surface, a flexible O-ring disposed in said channel adjacent an end wall of said channel, conduit means interconnecting a rear portion of said channel to said through bore and communicating between said end wall and said O-ring; said cylindrical piston end when disposed in said channel against said O-ring forming a hose end receiving gap between said tapered inner surface of said clamping sleeve and said tapered outer surface of said nipple end section to receive an end section of a flexible hose slid over said nipple end section and into said compression gap whereupon when fluid pressure is applied to said line, pressure will act upon said O-ring through said conduit means and against said cylindrical piston end, urging said clamping sleeve together with said hose end section outwardly and causing said hose end section to be compressed between said tapered inner surface of said clamping sleeve and said larger outer diameter section at a free end of said tapered outer surface of said nipple end section which move closer together to diminish said gap a distance less than the thickness of said hose.

2. A fluid pressure hose coupling as claimed in claim 1 wherein there is further provided a fluid exhaust hole provided in said clamping sleeve in an intermediate area thereof whereby to exhaust any fluid that may accumulate in a space formed between a rear circumferential wall of said hose and an inner surface of said clamping sleeve and a rear abutment wall behind said nipple end section as said hose is urged outwardly with said cylindrical piston.

3. A fluid pressure hose coupling as claimed in claim 1 wherein said cylindrical sleeve inner surface is provided with gripping means to engage in an outer surface of an end portion of a flexible hose to be secured about said nipple end section.

4. A fluid pressure hose coupling as claimed in claim 3 wherein there is further provided a sighting hole in said sleeve rearwardly of said gripping means to sight an end portion of a flexible hose positioned over said nipple end section.

5. A fluid pressure hose coupling as claimed in claim 4 wherein said gripping means is constituted by gripping projections extending outwardly of said inner surface.

6. A fluid pressure hose coupling as claimed in claim 5 wherein said gripping projections are constituted by one or more circumferential ridges.

7. A fluid pressure hose coupling as claimed in claim 6 wherein said circumferential ridges have a sawtooth cross-section defining a rearwardly sloping front wall leading to a sharp ridge and an abrupt transverse rear wall.

8. A fluid pressure hose coupling as claimed in claim 1 wherein said cylindrical piston end is dimensioned for close sliding fit in said circumferential channel, said flexible O-ring being disposed in close friction fit for fluid pressure sealing contact in said channel.

* * * * *